United States Patent [19]

Brunner

[11] 4,157,503
[45] Jun. 5, 1979

[54] APPARATUS AND METHOD FOR TESTING THE THICKNESS OF THE WALL OF A MOVING TUBE LEAVING AN EXTRUDER

[75] Inventor: Mathias Brunner, Twann, Switzerland

[73] Assignee: Zumbach Electronic AG, Orpund, Switzerland

[21] Appl. No.: 779,781

[22] Filed: Mar. 21, 1977

[30] Foreign Application Priority Data
Mar. 26, 1976 [DE] Fed. Rep. of Germany ....... 2612993

[51] Int. Cl.$^2$ ............................................. G01R 33/12
[52] U.S. Cl. .................................. 324/231; 264/40.1; 425/141
[58] Field of Search ............... 324/34 TK, 67, 37, 40, 324/229–231; 46/235, 238, 239, 240; 254/134.3 R, 134.3 FT, 134.4; 264/40.1, 40.2; 425/141

[56] References Cited

U.S. PATENT DOCUMENTS

| | | | |
|---|---|---|---|
| 2,470,338 | 5/1949 | Chilton | 324/37 |
| 2,525,738 | 10/1950 | Tormey | 46/240 |
| 2,898,550 | 8/1959 | Fisher | 324/40 |
| 3,702,934 | 11/1972 | Jakobsen | 250/358 P |
| 3,864,625 | 2/1975 | Zumbach et al. | 324/34 TK |

Primary Examiner—Robert J. Corcoran

[57] ABSTRACT

An apparatus for testing the wall thickness of a moving tube of plastics or other electrically non-conducting material being produced by an extruder, comprises an electrically conductive measurement body arranged in the moving tube, a ferromagnetic holding member which is arranged in the tube within effective range of a holding magnet located outside the tube and which has a tie connection to the measurement body to locate the measurement body axially within the effective range of a measuring sensor located outside the tube. The holding member and the measurement body may be introduced into the tube through a channel in the extruder head, shot into the tube from a forward position, or inserted through an aperture cut in the tube wall.

21 Claims, 10 Drawing Figures

March 15, 1977
Inventor

March 15, 1977
Inventor

March 15, 1977
Inventor

APPARATUS AND METHOD FOR TESTING THE THICKNESS OF THE WALL OF A MOVING TUBE LEAVING AN EXTRUDER

BACKGROUND OF THE INVENTION

This invention relates to an apparatus for testing the wall thickness of a tube of electrically non-conducting material produced by an extruder.

The apparatus according to the invention comprises an electrically conductive measurement body held within the moving tube and a measuring sensor situated outside the tube within effective range of the measurement body, and arrangements of this general type are described in, for example, Swiss Pat. No. 563,567. In most cases, the measurement body is located within the tube by attachment through some kind of rod to the mandrel of the extrusion nozzle, and thereby held in a predetermined axial position. This construction has the disadvantage that the measurement body must be fixed to the nozzle of the extruder before the latter is brought into operation, which complicates the operation because the measurement body is then immediately in the path of movement of the leading end of the tube issuing from the nozzle.

It is also known to introduce the measurement body freely into the tube to be measured and, by means of a magnet, to hold the measurement body in the desired axial position and against the wall of the tube. However, in this case the measurement body consists of a single rigid component which introduces the risk that, under the magnetic attraction which influences the measurement body from the side where the measuring sensor is situated, the measurement body will, on encountering irregularities or curvatures in the tube, bear tightly against the tube wall in the region of the holding magnet but have a certain amount of clearance from the tube wall in the region of the measuring sensor.

It is an object of the present invention to allow the measurement body to be held within the tube so that it will always be reliably seated against the inside of the tube, and to allow the introduction of the measurement body into the tube simply and without disturbing the production process.

SUMMARY OF THE INVENTION

According to the present invention there is provided an apparatus for testing the wall thickness of a moving tube of electrically non-conducting material produced by an extruder, said apparatus comprising a measurement body arranged in the moving tube, a ferromagnetic holding member which is arranged in the tube within effective range of a holding magnet located outside the tube and which has a tie connection to the measurement body to locate the measurement body axially within the effective range of a measuring sensor located outside the tube.

In the apparatus according to the present invention, the forces which determine the axial positioning of the measurement body in the tube are separated from the measurement body itself and cannot in any case act upon the latter, so that a constant close fit of the measurement body against the inside of the tube is ensured. The connection between the holding member and the measurement body may be effected by means of a flexible member such as a wire or cord. In such a case the measurement body can be held against the tube wall either by gravitational force or else, in a known manner, under the action of a second holding magnet. The division of the arrangement into a measurement body and a holding member, which can be flexibly connected together, means that these are comparatively small individual parts which can be correspondingly more easily handled. In particular, they can be introduced in a simple manner either from the rear side of the extruder in the direction of the delivery of the tube, or else, and usually preferably, they can be introduced from a forward position entering through the leading end of the tube.

DESCRIPTION OF PREFERRED EMBODIMENTS

Figure 1:
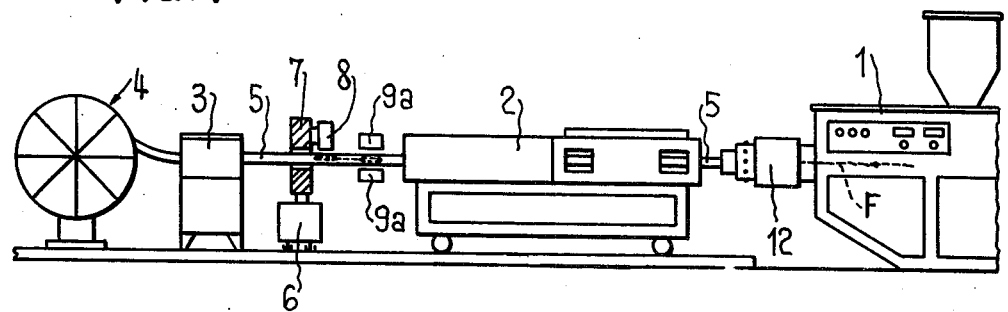
FIG. 1 is a diagrammatic elevation showing tube producing plant incorporating apparatus according to the invention.

Referring to the drawings, FIG. 1 shows an extruder 1, a cooling device 2, a switching device 3 and a reeling station 4 in a plant for producing synthetic plastics tube 5. The switching device 3 cuts off the tube automatically when a reel is full, and feeds the leading end of the tube onto an empty adjacent reel so as to ensure continuous production.

Figure 2:
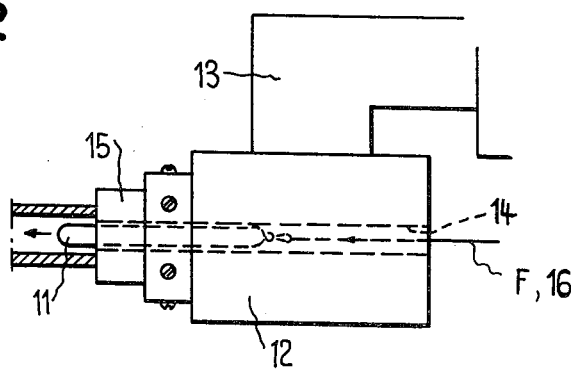
FIGS. 2 and 3 are enlarged detail views of parts of the plant shown in FIG. 1.
Figure 3:
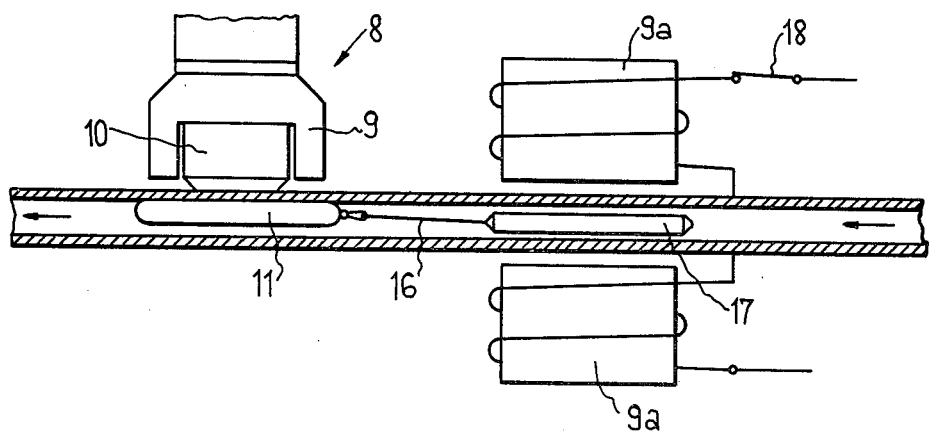

Between the cooling device 2 and the switching device 3, there is situated the testing apparatus according to the invention, which is also shown diagrammatically and which includes a measuring device 6 standing upon the floor and having a support 7 for a measuring head 8. At a predetermined distance before the measuring head, measured in the direction of travel of the tube being produced, there is provided a holding magnet 9a, the pole shoes of which are diagrammatically represented as rectangles. FIG. 3 shows the construction of the measuring head 8 which comprises a permanent magnet 9 of the U or pot type, and an electromagnetic measuring sensor system 10, of a known type, located within said magnet. In the operating condition, the permanent magnet 9 holds a measurement body 11 of ferromagnetic conducting material in the region of the measuring system 10 in close contact with the inner wall of the tube 5; in this arrangement, a particularly snug seating of the measurement body is achieved in the region of the measuring system 10 by virtue of the magnetic attraction operating at both sides of the measuring system. As shown in FIGS. 1 and 2, the extruder 1 is provided with an extruder head 12 to which the plastics material is fed through a side conduit 13 in such a manner that an open-ended channel 14 is formed in the extruder head 12 and leads into the centre of the extruder nozzle. As indicated in FIG. 2, the measurement body 11 can be introduced through the channel 14 into the tube 5.

FIG. 3 shows the operating condition, in which the measurement body 11 is situated in the region of the measuring head 8. The measurement body 11 has a flexible connection, by means of a cord 16, to a holding member 17 of ferromagnetic material. The holding member 17 is secured in its axial position by the holding magnet 9a which is preferred to be an electromagnet fed with alternating current so that the consequent vibration will minimise friction of contact between the holding member 17 and the inner face of the tube. The electromagnet 9a is controlled by means of a switch 18.

As already indicated, the measurement body 11 and the holding member 17 are introduced through the channel 14 of the extruder head 12 into the tube at a suitable instant during operation or while setting the plant in operation, and the measurement body and the holding member are then carried along by the tube 5 moving in the direction from the right to the left as depicted in FIG. 1. When the body 11 and the member 17 reach the positions shown in FIGS. 1 and 3, the magnet 18 should be energised to retain the holding member in the position shown in FIG. 3. The correct positioning of the parts 11 and 17 can be ensured by means of appropriate measuring sensors. It is however also possible, by means of the measuring system 10, to detect a change in the measuring conditions caused by the first effective entrance of the measurement body 11, and at that instant to switch the electromagnet 9a into circuit. At that time, the holding member 17 will in fact be situated within the effective range of influence of the magnet 9a, and will then be drawn into and retained in the desired position. As a result, the measurement body 11 will be attracted against the inner wall of the tube by the permanent magnet 9 situated in the region of the measuring system 10, the measurement body thus allowing a correct measurement of the wall thickness in a manner known per se.

Figure 4:
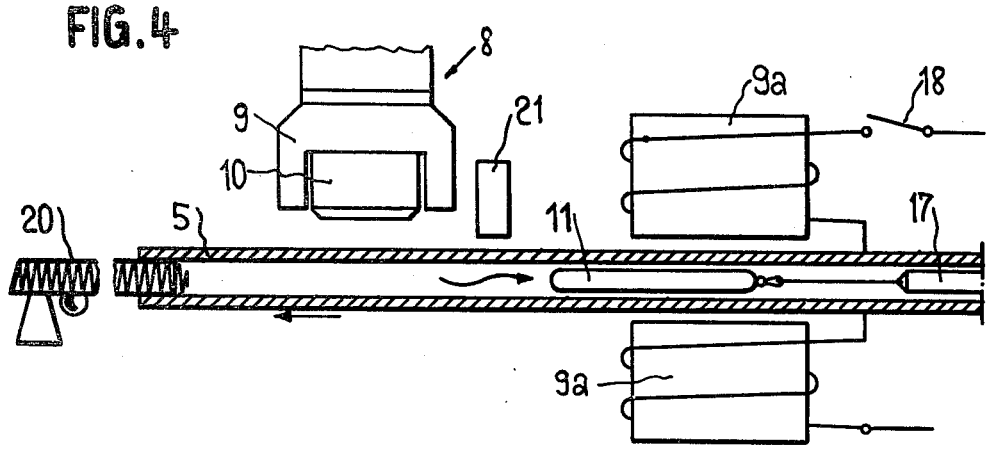
FIGS. 4 to 6 are diagrammatic views illustrating one method of introducing a measurement body and holding member into the tube.
Figure 5:
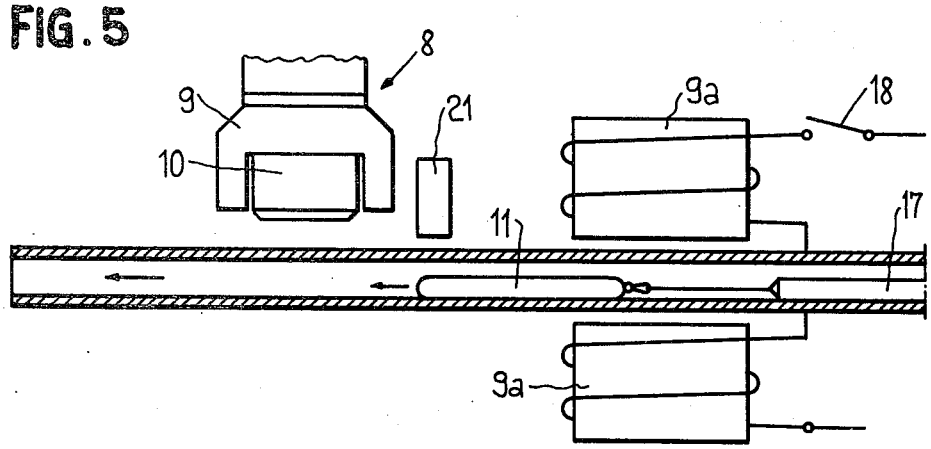
Figure 6:
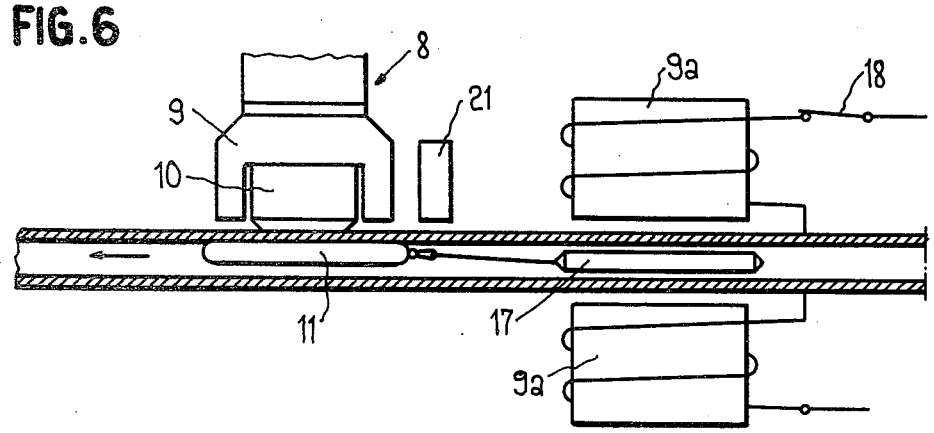

In many cases, the extruder is not provided, as it is in FIG. 2, with a channel 14 in the head 12, in which case the measurement body and the holding member cannot be introduced from a forward position through the leading end of the tube 5. Such a possibility is illustrated in FIGS. 4 to 6 where an impelling device 20, shown diagrammatically, is provided to project the holding member 17 and the measurement body 11 from a forward position into the tube 5 by releasing a compressed spring. The launching velocity of both the parts must be so chosen that the holding member 17 will reach at least the area of influence of the holding magnet 9a, and the measurement body 11 comes within the area of influence of the magnet 9 and the measuring system 10. As shown in FIG. 4, the measuring head 8, together with the magnet 9, is lifted away from the tube when shooting in the parts 11 and 17, so that the magnet 9 exerts practically no retarding influence upon the parts 11 and 17 entering the tube. Between the measuring head 8 and the holding magnet 9a there is positioned a detecting sensor 21, for example an inductive sensor, which releases a pulse through a suitable measuring circuit whenever one of the parts 11 or 17 passes its position.

As FIG. 4 illustrates, the launching velocity of the measurement body 11 and the holding member 17 is so selected that both of these members shoot past the sensor 21. As a result, two pulses are released. The parts 11 and 17 then stop and rest on the tube so that they are carried along as indicated in FIG. 5, whilst the magnet 9a still remains switched out of circuit. The measurement body 11 soon reaches the area of influence of the sensor 21, which releases a further pulse. At the end of this pulse, when the body 11 has reached the position shown in FIG. 6 which is in the effective region of the measuring head 8, the switch 18 is closed and thereby the electromagnet 9a is energised. Thus, the holding member 17 is held in the desired position, and the measuring head 8 can then be moved towards the tube, whereby the magnet 9 of the measuring head attracts the measurement body 11 in the described manner against the inner wall of the tube. Instead of using an electromagnet for this holding purpose it is also possible to employ a permanent magnet which would be moved towards the tube at the appropriate time.

Figure 7:
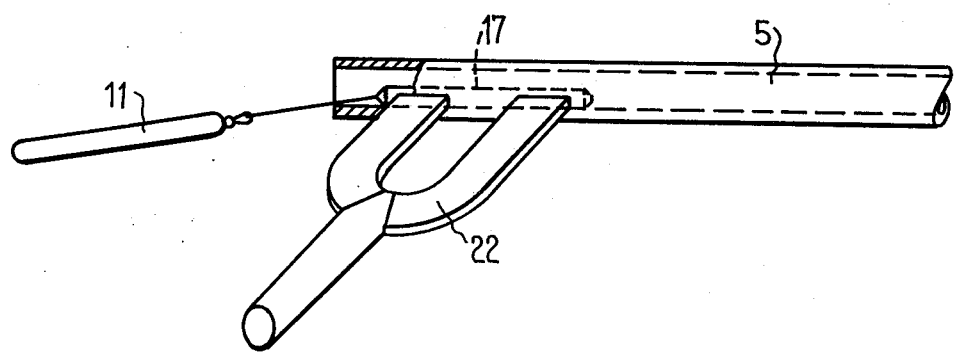
FIGS. 7 and 8 are diagrammatic views illustrating another method of introducing the measurement body and holding member into the tube; and, FIGS. 9 and 10 show, diagrammatically, a device for the automatic introduction of the measurement body and the holding member.
Figure 8:
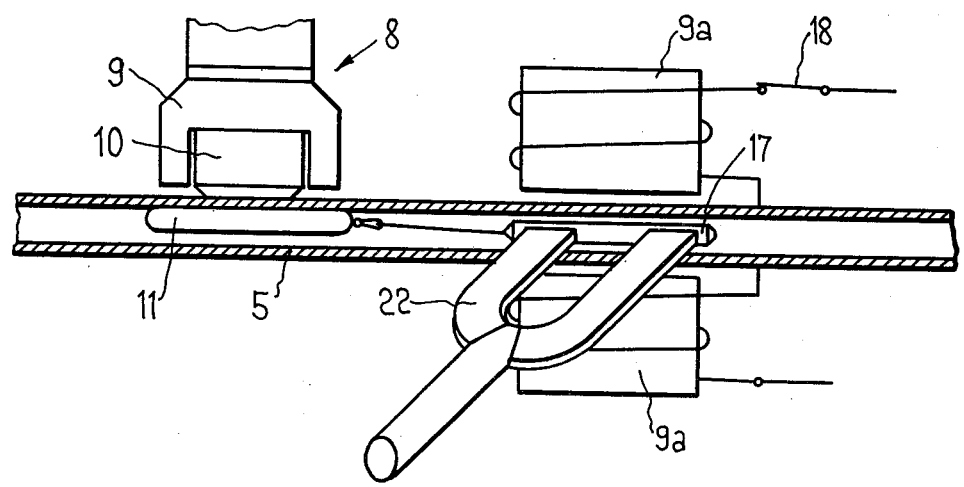

FIGS. 7 and 8 show, diagrammatically, a further possible means of introducing the holding member 17 and the measurement body 11 into the tube 5 from a forward position. In this case, an accessory device includes a horseshoe magnet 22 which retains the holding member 17 in the tube. It is therefore only necessary to introduce the holding member 17 into the tube from a forward position, and to retain the member in a suitable position by the external application of the magnet 22. The measurement body 11 is then also introduced into the tube, and the magnet 22 is moved along the tube 5 from a forward position until the holding member 17 comes into the range of the electromagnet 9a. The electromagnet is then switched into circuit, and the measuring head 8 is brought close to the tube as shown in FIG. 8, whereupon the horseshoe magnet 22 can be withdrawn. The holding member 17 is now secured in the area of the magnet 9a, and ensures that the measurement body 11 is secured in the desired position in the effective region of the measuring system 10 and the measuring head 8.

Previously, it has been assumed that the measuring head 8 must be provided with a magnet 9 in order to attract the measurement body against the tube wall. This may be necessary if the wall thickness of the tube is to be measured all the way round, in which case the measuring head 8 is rotated about the tube to carry the measurement body with it. It may, however, be sufficient if the wall thickness is determined along one axial section of the tube, in which case a measuring head 8, without a magnet 9, can be applied to the tube from below, whilst the measurement body 11 lies upon the tube wall under gravitational force.

The flexible connection between the holding member 17 and the measurement body 11 may be effected in an alternative manner. In particular, if these two parts are to be introduced into the tube from a forward position by means of an impelling device or an auxiliary magnet, it may be of advantage to provide between them a somewhat rigid, but still movable connection. Such a connection may comprise, for example, a helical spring or a leaf spring, or an elastic tie, and may facilitate the introduction of these parts as described with reference to FIGS. 7 and 8.

The auxiliary device including the magnet 22 according to FIGS. 7 and 8 may be provided with guide means to facilitate its manipulation. It is possible, for example, to provide a fork engaging around the tube to prevent the magnet from deflecting sideways when being pressed against the tube.

Figure 9:
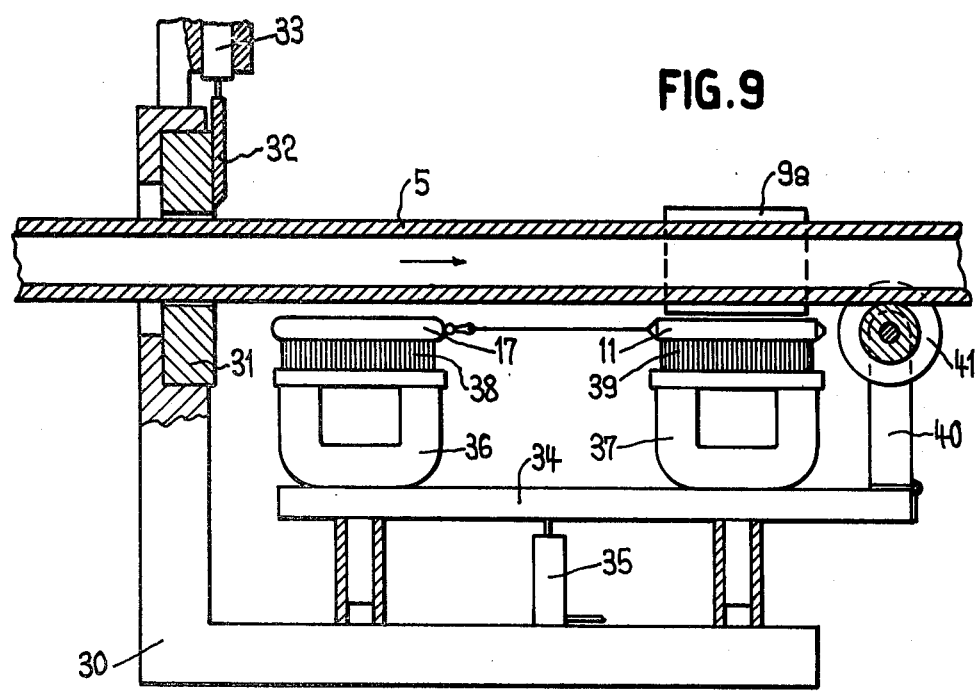
Figure 10:
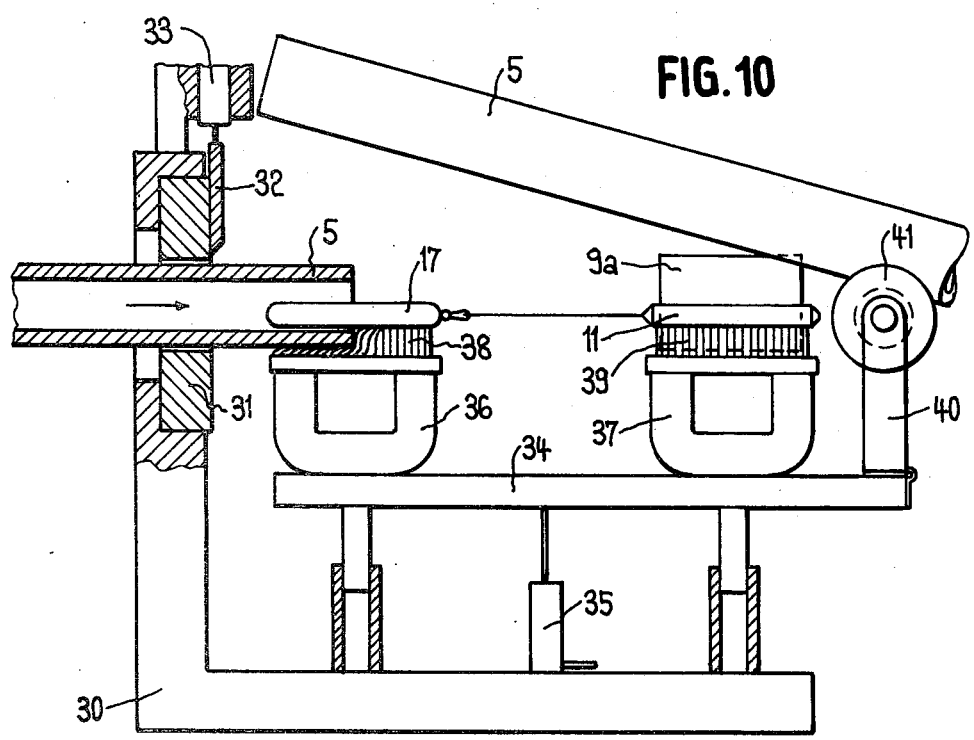

A fully automatic auxiliary device for introducing the measurement body and the holding member into the tube is shown diagrammatically in FIGS. 9 and 10. This device is shown in two working positions, and comprises a frame 30 having a guide ring 31 through which the tube 5 travels to the right as shown in the drawings, in the direction of the arrow. At the one end face of the ring 31, there is mounted a knife 32 which can be driven downwardly by a piston and cylinder device 33. On a support 34, which can be lifted upwardly by means of a piston and cylinder device 35, there are secured two permanent magnets 36 and 37 upon which are secured brushes 38 and 39. The measurement body 11 and the holding member 17 can be placed on these brushes where they are held by the fields of the magnets 36 and 37. Above the brush 39, in front of and behind the tube as seen in plan view, there are arranged holding electromagnets 9a which can be energised in the described manner. Upon a support 40, which is arranged to swing downwardly to the right, there is mounted a support roller 41 for the tube 5. The frame structure 30 carrying the parts mounted upon it is movable in the direction of travel of the tube 5.

The mode of operation of the auxiliary device is as follows:

At the start of an operation, the newly-formed tube 5 travels out of the extruder 1 and the cooling device, and passes through the rings 31 and over the support roller 41 as shown in FIG. 9. The first operation leading to the introduction of the measurement body 11 and the holding member 17, is to sever the tube in front of the ring 31 by rapid downward operation of the knife 32, whilst the device together with the tube proceeds towards the right. The knife is immediately retracted and, at the same time, the support 34 is raised by means of the piston and cylinder 35; as shown in FIG. 10, this causes the support roller 41 to raise the severed forward end of the tube which is removed from the normal path of movement of the tube. At the same time, the brushes 38 and 39 are raised to such an extent that the measurement body 11 and the holding member 17 are positioned in front of the new leading end of the tube, which then passes through the ring 31 as soon as the frame 30 no longer moves together with the tube to the right. The leading end of the travelling tube now passes over the brushes 38 and 39, whereby the holding member 17 and the measurement body 11 successively enter the tube, because they are prevented by the magnets 36 and 37 from moving along with the tube. The leading end of the moving tube then impinges against the support roller 41 and swings the latter downwardly so that the tube can continue to travel. The support 34 is now lowered to return to the rest position shown in FIG. 9, whereby the retaining influence of the magnets 36 and 37 upon the parts 17 and 11 is removed and these parts then travel along with the tube 5 to the right. At a suitable instant, the holding magnets 9a are switched into circuit in order to retain the holding member 17 in position within the tube. The rest position of the auxiliary device is so selected that now the measurement body 11 is situated at the correct position within range of the measuring device, which is not shown in FIGS. 9 and 10.

The auxiliary device illustrated in FIGS. 9 and 10 permits an automatic introduction of the measurement body and holding member into the tube, virtually irrespective of the condition and shape of the leading end of the tube, which often is not so open and clean as to allow the measurement body and the holding member to be introduced through that end. Due to the support afforded to the tube in the guide ring 31, the cross-section of the tube remains substantially unchanged when cutting, so that the measurement body and the holding member can be received therein without particular difficulty.

If an extruder according to FIG. 2 is provided, there exists the possibility of providing only a measurement body 11 and of anchoring this to the extruder by means of a cord. Such an anchoring cord F is indicated in FIG. 1. In this case, the holding member (17) and the holding magnet (9a) can be omitted. By suitable choice of the length of the cord, the position of the measurement body in the tube can be determined sufficiently accurately, especially if the measuring point is not too far removed from the extruder.

In certain cases a measurement body (11) could be provided, which, by means of a holding magnet associated with it, is attracted to make intimate contact with the inside of the tube and is ensured against axial displacement out of the range of the measurement device.

A further possible method for introducing the measurement body and/or the holding member, which is particularly applicable in the case of large and relatively slowly travelling tubes, consists in cutting along the travelling tube from above with a knife or a milling tool, and allowing the measurement body and/or the holding member to fall into the slot which is made behind the knife or milling tool. The holding magnet, or the holding magnets, for the measurement body and/or the holding member may be directly situated at the place or places, at which said members descend, or else these parts may be carried along by the tube to be then be held in the region of the holding magnets in a manner already described with reference to FIGS. 1 to 3. In this case also, it is possible to provide an automatic device for introducing the measurement body and/or the holding member, said device having, for example, a milling tool automatically adjustable from above with reference to the tube, behind which milling tool there is provided a mechanical or magnetic holding device for the measurement body and/or the holding member, which allows these parts to fall as soon as a sufficiently long slot is formed in the upper wall of the tube.

When, for measuring the wall thickness at various peripheral points of the tube, the holding magnet for the measurement body is moved around the tube, it may also be necessary, particularly when measuring large tubes, to rotate the holding magnet for the holding member likewise around the tube, in order that the measurement body and the holding member shall always be situated in approximate axial alignment.

Between the measurement body and the holding member there may be provided a common guide tube, for example surrounding the wire connection between them. By arranging that this common guide tube is of smaller external diameter than the measurement body and the holding member, the desired relative positioning upon introducing the parts into the tube can be ensured.

As a propellant for shooting the measurement body 11 and the holding member 17 into the tube from a forward position it is also possible to employ a compressed gas, for example nitrous oxide.

I claim:

1. An apparatus for testing the wall thickness of a moving tube electrically non-conducting material produced by an extruder, comprising a measuring body and a first holding magnet approached towards the tube wall from outside for radially pulling said measuring body into contact with the inner surface of the tube wall, a measuring sensor approached towards the outer surface of said tube near said first holding magnet, said measuring sensor being influenced by said measuring body in accordance with the mutual distance between measuring sensor and measuring body, this distance being determined by the wall thickness, a holding body upstream said measuring body with reference to the moving direction of said tube and a second holding magnet approached towards the outer surface of said tube for determining by its magnetic pull the axial position of said holding body within said tube, said measuring body being connected to said holding body such that its position is axially determined but is permitted free radial movement.

2. An apparatus according to claim 1, wherein said second holding magnet has two poles located at opposite sides of said tube.

3. An apparatus according to claim 1, wherein said second holding magnet is an electromagnet.

4. An apparatus according to claim 3, comprising control means for said electromagnet, such control means including a feeler approached towards the outer surface of the tube for detecting the presence of said measuring body or holding body within the tube.

5. An apparatus according to claim 4, in which said feeler is arranged at a predetermined distance upstream, said measuring sensor in the direction of travel of the tube.

6. An apparatus according to claim 1, in which said measuring body and said holding body are in the form of longitudinally extended cylindrical members having tapering ends.

7. An apparatus according to claim 1, in which said extruder has a nozzle and includes an open-ended channel discharging into the centre of said nozzle, through which channel said measurement body and said holding member are introduced into said tube.

8. An apparatus according to claim 1, comprising shooting means for said measuring body and said holding body into said tube through its advancing end.

9. An apparatus according to claim 8, in which said shooting means are gas-powered.

10. An apparatus according to claim 1, comprising an auxiliary manually operable permanent magnet adapted to retain said holding body in an axially determined position within the moving tube.

11. An apparatus according to claim 1, wherein said first holding magnet has axially spaced poles between which said measuring sensor is situated.

12. An apparatus according to claim 1, comprising cutting means for automatically cutting the tube, and means for introducing said measuring body and said holding body into the tube.

13. An apparatus according to claim 12, comprising guide means for said tube, supporting means for loosely supporting said measuring body and said holding body, said supporting means and said guide means being displaceable in a direction transverse to the tube axis for transversally removing a cut-off end of the tube and allowing the new end of the tube to issue, whilst said supporting means shift the measuring body and the holding body in front of the new end of the tube.

14. An apparatus according to claim 13, in which said supporting means comprise two brushes including each an auxiliary holding magnet, said measuring body and said holding body being each supported on one of said brushes and maintained in a determined axial position on said brushes and within said tube respectively by said auxiliary holding magnets.

15. An apparatus according to claim 13, comprising a guide ring for said tube, the internal diameter of the guide ring being dimensioned to receive the tube with small clearance, and said cutting means being mounted at one face of the guide ring.

16. An apparatus according to claim 13, in which said cutting means, said guide means and said supporting means are axially displaceable with the tube at least during the cutting of the tube.

17. A method for measuring the wall thickness of a tube of electrically non-conducting material leaving an extruder, comprising approaching first and second holding magnet means towards the outer surface of the tube, providing an assembly of a measuring body and a holding body loosely coupled with each other, such that their relative position is axially determined but free relative radial movement is permitted, introducing said assembly with said holding body upstream with reference to the tube advance into said tube and positioning it in the moving tube by keeping said holding body in a determined axial position by magnetic forces of said first holding magnet means and by radially applying said measuring body against the inner surface of the tube wall by magnetic forces of said second holding magnet means, approaching a measuring sensor responsive to said measuring body towards the outside of said tube where said measuring body is applied against the inner surface thereof, the tube thickness being determined from the response of said measuring sensor, this response depending on the distance between said measuring body and said measuring sensor.

18. A method according to claim 17, in which said assembly is shot into the tube through its advancing end.

19. A method according to claim 17, comprising providing an auxiliary hand operable permanent introducing magnet, introducing said holding body into the advancing end of the tube and keeping it within the tube by magnetic force of said introducing magnet, displacing said introducing magnet with said holding body and measuring body coupled therewith along the tube into the range of said holding magnet means, and then removing the introducing magnet from the tube.

20. A method according to claim 17, in which the tube is cut off and then said assembly is introduced into the cut end of the tube.

21. A method according to claim 17, in which the tube wall of the advancing tube is cut open at its upper side and said assembly is radially introduced into the tube through the resulting aperture.

* * * * *